US011294657B2

(12) United States Patent
Freese et al.

(10) Patent No.: US 11,294,657 B2
(45) Date of Patent: Apr. 5, 2022

(54) DATA COPYING

(71) Applicant: HEWLETT-PACKARD DEVELOPMENT COMPANY, L.P., Houston, TX (US)

(72) Inventors: Timothy J Freese, Fort Collins, CO (US); Michael J Frick, Houston, TX (US); Zachary Tahenakos, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/557,927

(22) PCT Filed: May 15, 2015

(86) PCT No.: PCT/US2015/031104
§ 371 (c)(1),
(2) Date: Sep. 13, 2017

(87) PCT Pub. No.: WO2016/186617
PCT Pub. Date: Nov. 24, 2016

(65) Prior Publication Data
US 2018/0052674 A1 Feb. 22, 2018

(51) Int. Cl.
*G06F 8/61* (2018.01)
*G06F 16/11* (2019.01)
(Continued)

(52) U.S. Cl.
CPC ............. *G06F 8/63* (2013.01); *G06F 16/128* (2019.01); *G06F 16/178* (2019.01); *G06F 16/1727* (2019.01)

(58) Field of Classification Search
CPC ................ G06F 8/63; G06F 17/30088; G06F 17/30138; G06F 17/30174;
(Continued)

(56) References Cited

U.S. PATENT DOCUMENTS 5,487,160 A * 1/1996 Bemis ................ G06F 11/1466
711/114
5,819,292 A 10/1998 Hitz et al.
(Continued)

FOREIGN PATENT DOCUMENTS

| EP | 2490123 A2 | 8/2012 |
| TW | 201007577 A | 2/2010 |
| TW | I475489 | 3/2015 |

OTHER PUBLICATIONS

Norton Ghost User's Guide, Version 6.8, Published by Symantec, pp. 1-220 (Year: 2002).*
(Continued)

*Primary Examiner* — S. Sough
*Assistant Examiner* — Zheng Wei
(74) *Attorney, Agent, or Firm* — Michael A. Dryja

(57) ABSTRACT

An example system includes a storage device. The system also includes a file creation component to create a blank file on the storage device. The system further includes a block copy component to edit the blank file to include a block-for-block copy of a boot partition. The system further includes a logical copy component to copy data determined to be live from a root partition to the blank file. The root partition includes live and unreferenced versions of a stored file.

11 Claims, 6 Drawing Sheets

(51) Int. Cl.
*G06F 16/178* (2019.01)
*G06F 16/17* (2019.01)

(58) Field of Classification Search
CPC ........... G06F 16/00–122; G06F 16/128; G06F 16/13–1727; G06F 16/184–1844
See application file for complete search history.

(56) References Cited

U.S. PATENT DOCUMENTS

| | | | | |
|---|---|---|---|---|
| 6,144,992 | A * | 11/2000 | Turpin | G06F 8/63 709/208 |
| 6,615,365 | B1 | 9/2003 | Jenevein et al. | |
| 6,665,779 | B1 * | 12/2003 | Polfer | G06F 11/1451 711/112 |
| 6,804,774 | B1 * | 10/2004 | Larvoire | G06F 9/4406 713/2 |
| 7,370,234 | B2 * | 5/2008 | Stakutis | G06F 11/1417 713/2 |
| 7,565,517 | B1 * | 7/2009 | Arbon | G06F 8/63 709/220 |
| 7,757,228 | B1 * | 7/2010 | Eatough | G06F 8/61 717/174 |
| 8,032,498 | B1 * | 10/2011 | Armangau | G06F 16/128 707/690 |
| 8,140,907 | B2 | 3/2012 | Beaty et al. | |
| 8,151,263 | B1 * | 4/2012 | Venkitachalam | G06F 9/485 711/162 |
| 8,244,681 | B2 * | 8/2012 | Laffin | G06F 11/1451 707/644 |
| 8,478,799 | B2 | 7/2013 | Beaverson et al. | |
| 8,752,039 | B1 * | 6/2014 | Bapat | G06F 8/65 717/171 |
| 8,756,598 | B1 * | 6/2014 | Costea | G06F 9/45558 718/1 |
| 8,990,618 | B2 * | 3/2015 | Tam | G06F 11/1417 714/15 |
| 8,996,566 | B2 | 3/2015 | Haustein et al. | |
| 9,026,565 | B2 * | 5/2015 | Zachariassen | G06F 17/30067 707/821 |
| 9,696,919 | B1 * | 7/2017 | Vankamamidi | G06F 3/065 |
| 2004/0073783 | A1 * | 4/2004 | Ritchie | G06F 9/4406 713/1 |
| 2004/0088367 | A1 * | 5/2004 | Reinke | G06F 8/63 709/215 |
| 2005/0044548 | A1 * | 2/2005 | Page | G06F 8/63 718/100 |
| 2005/0132123 | A1 * | 6/2005 | Glaum | G06F 8/63 711/100 |
| 2007/0180206 | A1 * | 8/2007 | Craft | G06F 11/1433 711/162 |
| 2008/0104588 | A1 * | 5/2008 | Barber | G06F 8/63 718/1 |
| 2008/0184218 | A1 * | 7/2008 | Largman | G06F 8/65 717/168 |
| 2009/0222496 | A1 * | 9/2009 | Liu | G06F 3/0482 |
| 2010/0115004 | A1 * | 5/2010 | Liao | G06F 11/1417 707/822 |
| 2010/0131480 | A1 * | 5/2010 | Schneider | G06F 3/0619 707/698 |
| 2012/0066183 | A1 * | 3/2012 | Adkins | G06F 16/11 707/649 |
| 2012/0066677 | A1 | 3/2012 | Tang | |
| 2012/0221612 | A1 | 8/2012 | Zachariassen | |
| 2013/0066930 | A1 * | 3/2013 | Kamei | G06F 3/065 707/823 |
| 2013/0132691 | A1 * | 5/2013 | Banga | G06F 21/53 711/162 |
| 2013/0159257 | A1 * | 6/2013 | Rao | G06F 16/128 707/649 |
| 2013/0339406 | A1 | 12/2013 | Kanfi | |
| 2015/0074064 | A1 | 3/2015 | Goldberg et al. | |
| 2016/0041782 | A1 * | 2/2016 | Deetz | G06F 17/30 711/161 |
| 2016/0110258 | A1 * | 4/2016 | Haustein | G06F 11/1469 714/19 |

OTHER PUBLICATIONS

PowerQuest Driver Image 7.0 User Guide, published by PowerQuest Corporation, pp. 1-97 (Year: 2003).*

Ohad Rodeh, "IBM Research Report, Defragmentation Mechanisms for Copy-on-Write File-systems", published by Computer Science, Apr. 26, 2010, pp. 1-10 (Year: 2010).*

Marc Merlin, "Why you should consider using Btrfs, real COW snapshots and file level incremental server OS upgrades", Linuxcon 2014, May 21, 2014, Tokyo, Japan.

Nafisa Mandliwala et al., "Btr-Diff: An innovative Approach to Differentiate BtrFs Snapshots," Dec. 8, 2014, pp. 7-12. 2014 Linux Symposium.

Ohad Rodeh, "BTRFS: The Linux B-tree Filesystem", ACM Transactions on Storage, Aug. 2013, pp. 9:1-9:32, vol. 9—Issue 3, ACM, New York, NY.

* cited by examiner

DATA COPYING

BACKGROUND

Copy-on-write (COW) file systems, such as a B-Tree File System (BTRFS), Zettabyte File System (ZFS®), QNX® 6 File System (QNX6FS), etc., may include multiple versions of a file. For example, a COW file system may include multiple subvolumes, multiple snapshots, or the like, and the different subvolumes or snapshots may include different versions of the file. Multiple subvolumes or snapshots may include references to a same file.

DETAILED DESCRIPTION

A user may wish to copy data on a storage device. For example, in one scenario, a user may want to customize the software or features on a device and capture an image of the data on the device. The user may want to create a bootable image that includes a complete file system, so the user can deploy the image onto a plurality of devices.

The file system may have multiple subvolumes or snapshots that include multiple versions of files. The file system may include metadata that tracks which subvolumes or snapshots reference each file and how many references there are to each file. Storage space associated with files that nothing references may be reclaimed. Unreferenced files may remain on the file system until the space is reclaimed.

As used herein, live data is data, including metadata, that is referenced by file system metadata; unreferenced data is data, including metadata, that is not referenced by file system metadata. For example, a BTRFS may include tree-structured metadata with a root node. Data that is reachable from a root node using a path in the tree is live data, and data that is not reachable from the root node is unreferenced data.

The user may want to copy a boot partition and a root partition containing a file system while including multiple versions of files across subvolumes or snapshots. However, the user may not want to copy unreferenced files and unused space that are present in the file system. For example, a partition containing the file system may be significantly larger than the space consumed by live data in the file system due to the unused space and unreferenced files. Accordingly, copying the entire partition block for block to an image file will be time consuming and result in an image file that wastes space. Moreover, the devices receiving the block-for-block copied image file will waste resources reclaiming space occupied by unreferenced files. A file copy of the data will fail to capture all live versions of the data and fails to recreate the structure of the file system. A file copy also will not be able to copy a boot partition properly.

As used herein, block-for-block copying refers to copying that maintains the organization as well as the contents of copied data. For example, the contents of each block from a source may be copied to a corresponding block at a destination. The relative locations of the blocks may be maintained during copying. A block-for-block copy also may be referred to as a sector-by-sector copy.

Disclosed herein are examples of implementations that are able to copy a boot partition and a root partition containing multiple versions of files correctly. The user may recreate the boot partition and root partition without copying unreferenced files and unused space to save time, space, and resources (e.g., processing time, wear and tear on storage devices, etc.). When deploying the boot partition and root partition to numerous devices, the savings may be substantial.

Figure 1:
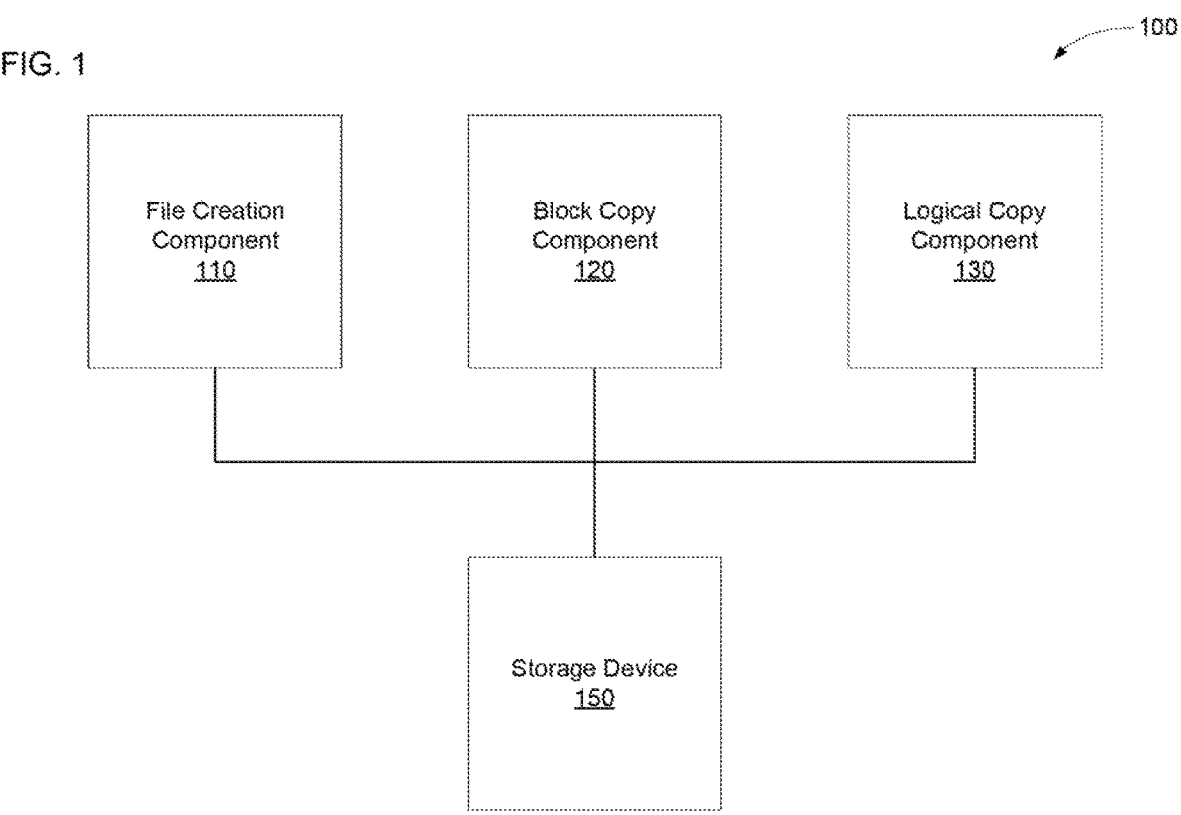
FIG. 1 is a block diagram of an example of a system to copy data on a storage device.

FIG. 1 is a block diagram of an example of a system 100 to copy data on a storage device 150. The storage device 150 may include a boot partition, which may contain a boot record, a kernel, a boot loader, etc., and a root partition, which may contain a file system. The system 100 may include a file creation component 110, which may create a blank file on the storage device 150. For example, the file creation component 110 may use a /dev/zero interface to create a file that contains all zeros. The file creation component may create the blank file on the storage device 150 or may create the blank file on another storage device. The blank file may be edited to create an image file that can be deployed onto other devices.

As used herein, the term 'component' refers to a combination of hardware (e.g., a processor such as an integrated circuit or other circuitry) and software (e.g., programming such as machine- or processor-executable instructions, commands, or code such as firmware, programming, or object code). A combination of hardware and software includes hardware only (i.e., a hardware element with no software elements such as an application specific integrated circuit (ASIC)), software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The system 100 may include a block copy component 120. The block copy component 120 may copy contents of the boot partition block for block to the blank file. The block copy component 120 may copy all the data stored on the boot partition and maintain the ordering of the data. Thus, the blank file may include an identical and complete copy of the boot partition once the block copy component 120 has completed copying. When the image is deployed onto another storage device, the storage device may be able to boot off of the copied boot partition.

A logical copy component 130 may copy the file system on the root partition to the blank file. The logical copy component 130 may append the root partition after the boot partition. The file system may include multiple subvolumes or snapshots and may include multiple versions of files. The multiple versions of the files may include live versions of the file and versions of the file unreferenced by file system metadata. In an example, the file system is a COW file system. The logical copy component 130 may include the live data, including live metadata, in the copy but may not include unreferenced data. The logical copy component 130 may copy the multiple subvolumes or snapshots and may copy multiple live versions of a file to the blank image file.

In an example, the file system may include metadata indicating live subvolumes or snapshots. The metadata may also indicate which metadata is live metadata. The metadata may include a reference counter indicating how many times each piece of data, including metadata, is referenced or if it is not referenced at all. The logical copy component 130 may determine live data based on whether the reference counter has a nonzero value. Alternatively, or in addition, the metadata may be organized in a tree structure. The logical copy component 130 may determine data is live if it is found by traversing the tree structure. The logical copy component 130 may copy to the blank file the root node and the data, including metadata, found by traversing the tree structure from the root node.

Figure 2:
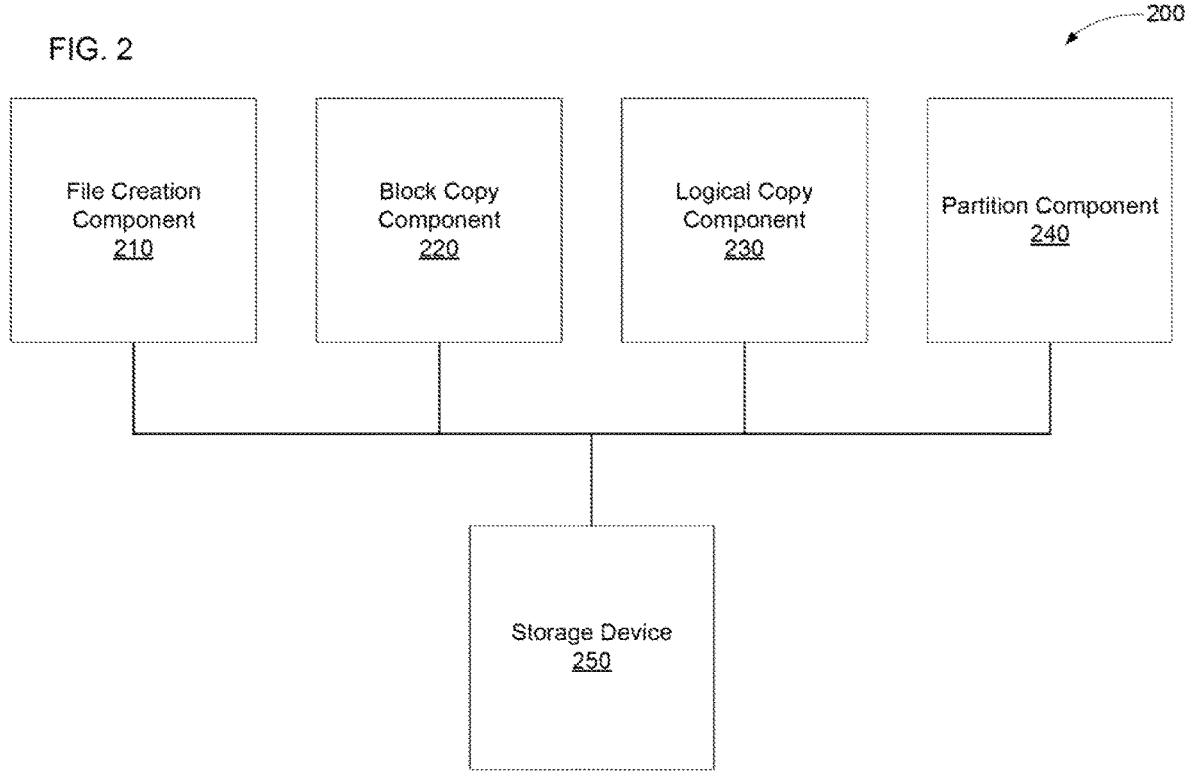
FIG. 2 is a block diagram of another example of a system to copy data on a storage device.

FIG. 2 is a block diagram of another example of a system 200 to copy data on a storage device 250. The system 200 may include a partition component 240. The partition component 240 may create a new partition on the storage device 250 to hold an image file. The partition component 240 may determine how much free space is available on the storage device 250. The partition component 240 may also determine how much space is consumed by boot and/or root partitions on the storage device 250. In an example, the partition component 240 may determine the consumed space of the root partition without distinguishing live data in a file system from unreferenced data. Alternatively, or in addition, the partition component 240 may determine the space consumed by live data. For example, the partition component 240 may initially determine the consumed space without distinguishing live data from unreferenced data but may later determine the space consumed by live data if it needs to do so.

The partition component 240 may compare the free space to the consumed space to determine whether there is sufficient room to store an image file containing copies of the root and boot partitions in the free space. For example, the partition component 240 may determine whether the free space exceeds the consumed space of the boot and root partitions plus a predetermined offset. The offset may ensure the image file does not become full during copying. The partition component 240 may perform the comparison based on the space consumed by live and unreferenced data, based on the space consumed by live data, initially based on live and unreferenced data but then based on live data if the partition component detects insufficient space initially, or the like. If there is insufficient space, the partition component 240 and the system 200 may abort creating the partition and image file, ask for a new destination for the image file, or the like. Otherwise, the partition component 240 may proceed with creating the partition.

The partition component 240 may shrink the root partition to create an unpartitioned space. For example, the partition component 240 may instruct the file system to reduce the amount of storage it is using within the partition and may adjust the root partition boundaries to create the unpartitioned space. The root partition boundaries may be modified by removing a partition and recreating the partition with new boundaries, editing the boundaries in a partition table, or the like. The partition component 240 may adjust the partition boundaries so that the unpartitioned space will be large enough to hold the image file. The partition component 240 may create a new partition using the unpartitioned space. A file creation component 210 may create a blank file on the new partition that will be used as an image file.

The system 200 may include a block copy component 220. The block copy component 220 may edit the image file created on the new partition to include a block-for-block copy of the boot partition. The system 200 may also include a logical copy component 230. The logical copy component 230 may edit the image file to include a copy of the file system from the root partition. The logical copy component 230 may edit the image file to include live data from the file system but not unreferenced data to be garbage collected or unused space from the file system. The image file may be deployed to other storage devices to create bootable storage devices that include the copied file system.

Figure 3:
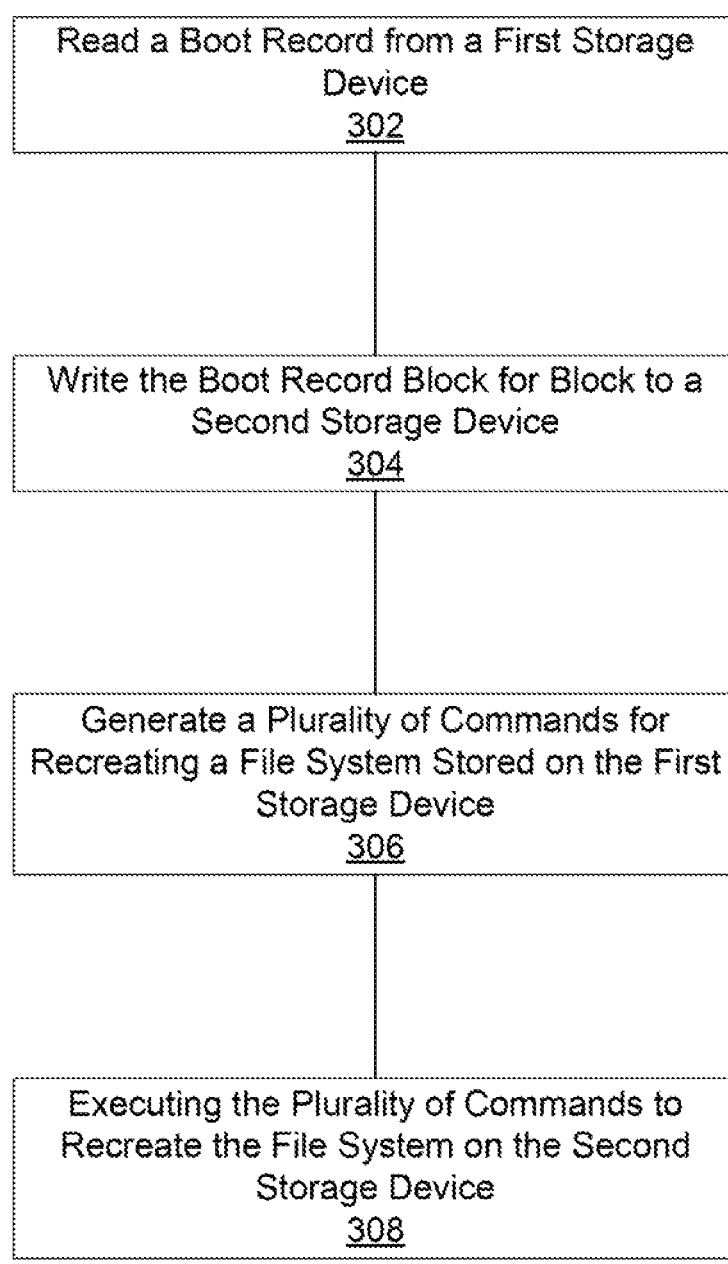
FIG. 3 is a flow diagram of an example of a method for copying data on a first storage device.

FIG. 3 is a flow diagram 300 of an example of a method for copying data on a first storage device. A processor may perform the method. At block 302, the flow diagram 300 includes reading a boot record from the first storage device. At block 304, the boot record is written block for block to a second storage device. The reading and writing of the boot record may maintain the organization and contents of the boot record exactly from the first storage device to the second storage device. Accordingly, the second storage device may be bootable using, inter alia, the boot record. In an example implementation, the block copy component of FIG. 1 may read and write the boot record.

Block 306 includes generating a plurality of commands for recreating a file system stored on the first storage device. For example, the file system may include a plurality of subvolumes or snapshots, which may include multiple versions of files and may include files referenced by multiple subvolumes or snapshots. Generating the plurality of commands for recreating the file system may include creating a stream that includes data from the file system and commands for creating multiple versions of files in the data, for generating references to files from multiple subvolumes or snapshots, or the like. In one example implementation, a plurality of commands for a first storage device with BTRFS may be generated using a Send command provided by BTRFS.

At block 308, the plurality of commands is executed to recreate the file system on the second storage device. The recreated file system on the second storage device may include the live data from the file system on the first storage device. When executed, the plurality of commands may not recreate unreferenced data from the first storage device. Accordingly, the second storage device may include live data from the first storage device but not unreferenced data. When executed, the plurality of commands may recreate the subvolumes or snapshots from the first storage device as well. In one example implementation, a plurality of commands from a first storage device with BTRFS may be executed using a Receive command provided by BTRFS. Referring to FIG. 1, the logical copy component 130 may generate and execute the plurality of commands in an implementation. The second storage device may be bootable and include a complete file system without unreferenced data after the boot record has been written and the plurality of commands has been executed.

Figure 4:
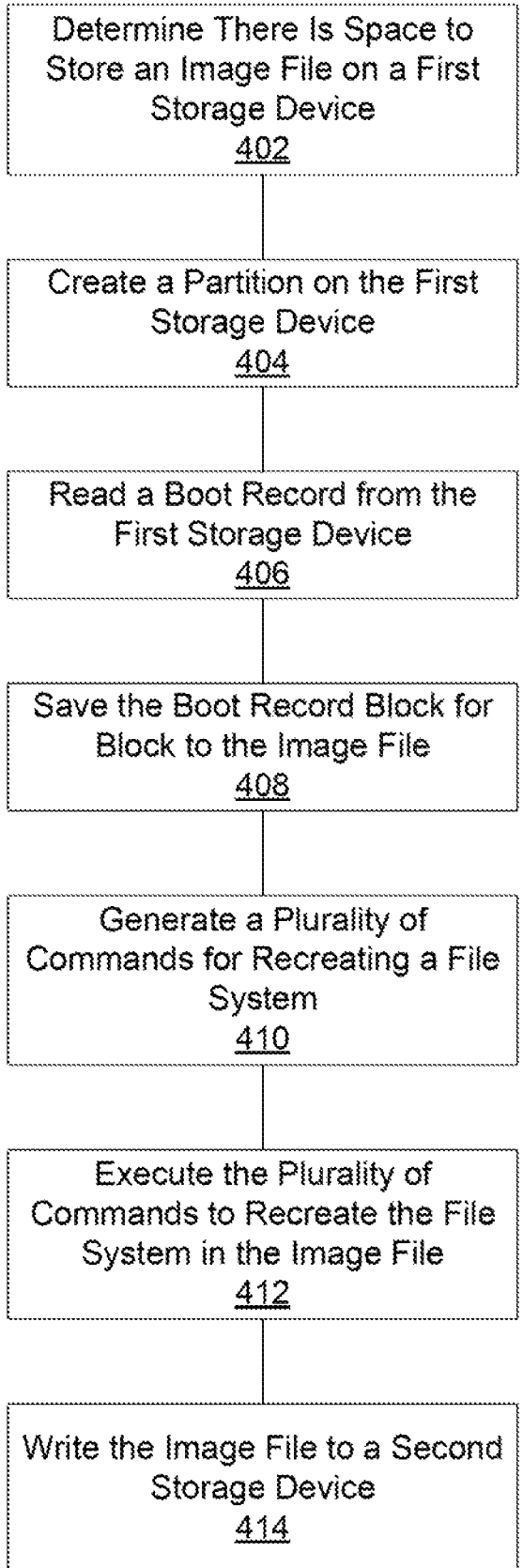
FIG. 4 is a flow diagram of another example of a method for copying data on a first storage device.

FIG. 4 is a flow diagram 400 of another example of a method for copying data on a first storage device. At block 402, the flow diagram 400 may include determining whether there is space to store an image file on the first storage device. Determining whether there is space may include determining free space on the first storage device and consumed space on the first storage device. The consumed space may include space consumed by a boot record on the first storage device and space consumed by a file system on the first storage device. The consumed space may be the space consumed by live data, the space consumed by live and unreferenced data, or the like. The free space may be compared to the consumed space to determine whether the free space is large enough to hold an image file of the consumed space (e.g., whether the free space is larger than the consumed space plus an offset). A new destination for the image file may be requested if the first storage device is not large enough to hold it, or the method may be aborted.

At block 404, a new partition may be created on the first storage device. An existing partition having free space may be shrunk to create unpartitioned space. The existing partition may be shrunk by requesting that the file system rearrange any data that would prevent shrinking of the partition and adjusting the partition boundary. The existing partition may be shrunk enough for there to be room for a new partition that will hold an image file of the boot record and the file system. The unpartitioned space may be used to create the new partition. Referring to FIG. 2, a partition component 240 may determine whether there is enough free space, shrink the existing partition, and create the new partition in an implementation.

Block 406 may include reading a boot record from the first storage device. At block 408, the boot record may be saved block for block to an image file. Saving may include creating the image file, or the image file may have been created in advance. Saving the boot record to the image file may include saving the image file on the new partition. The saved data may have an identical organization and identical content relative to the boot record read from the first storage device. Accordingly, the boot record may still be bootable when the image file is deployed to other devices. In an example implementation, the block copy component 220 of FIG. 2 may read the boot record and save the boot record block for block to the image file.

Block 410 includes generating a plurality of commands for recreating a file system on the first storage device. At block 412, the plurality of commands may be executed to recreate the file system in the image file. Generating the plurality of commands may include generating a stream that includes data from the file system and commands to recreate the structure of the file system. For example, the file system may include multiple subvolumes or snapshots, which may reference a same file or different versions of a file. The commands, when executed, may recreate the different versions of the file and the correct references between subvolumes or snapshots and files in the image file. The commands may recreate live data from the file system in the image file without recreating unreferenced data from the file system in the image file.

Block 414 may include writing the image file to a second storage device. The image file may include the boot record read and written block for block from the first storage device and the file system recreated using the generated commands. Writing the image file to the second storage device may make the second storage device bootable and cause the second storage device to have a complete copy of the structure and live data from the file system. The second storage device may not have unreferenced data from the file system included on it after the image file has been written.

Figure 5:
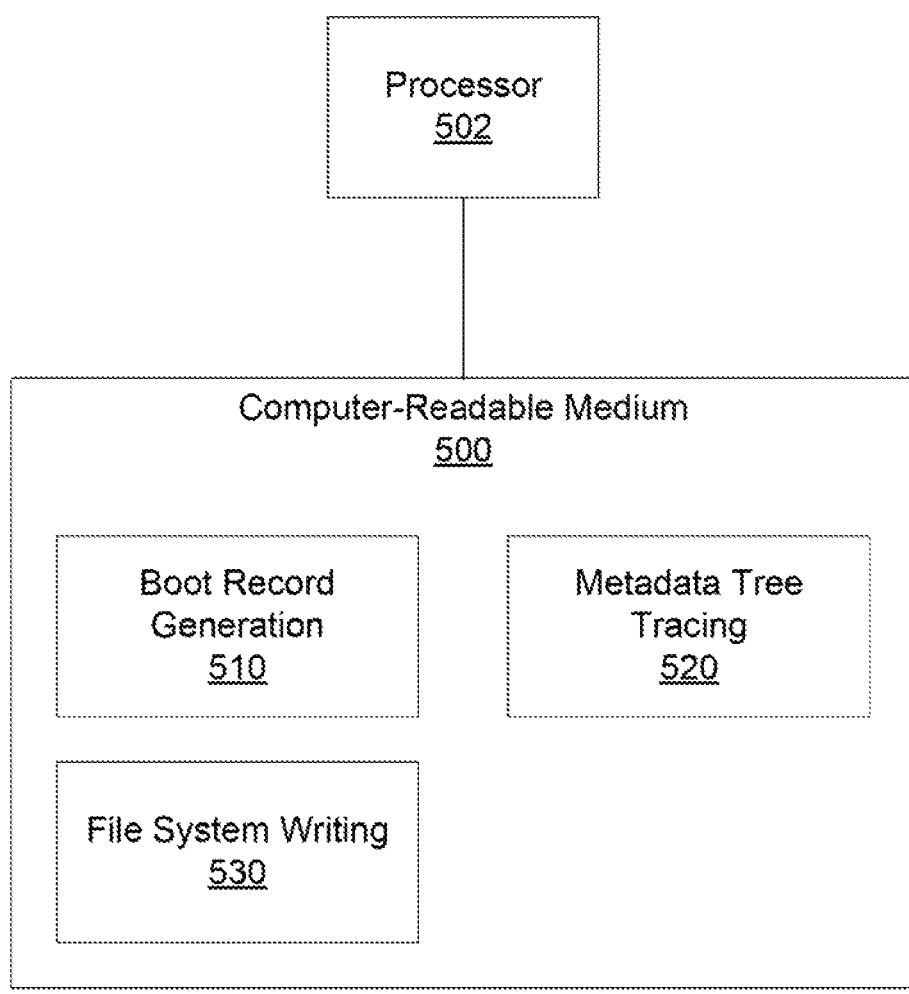
FIG. 5 is a block diagram of an example of a computer-readable medium containing instructions to copy data.

FIG. 5 is a block diagram of an example of a computer-readable medium 500 containing instructions that when executed by a processor 502, cause the processor 502 to copy data. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, a field programmable gate array (FPGA), a programmable array logic (PAL), a programmable logic array (PLA), a programmable logic device (PLD), etc.

The computer-readable medium 500 may include a boot record generation module 510. As used herein, a module (in some examples referred to as a software module) is a set of instructions that when executed or interpreted by a processor or stored at a processor-readable medium realizes a component or performs a method. The boot record generation module 510 may include instructions that cause the processor 502 to generate a boot record in an image file. The boot record generation module 510 may cause the processor 502 to generate the boot record by creating a boot record identical to a boot record in another location. Alternatively, or in addition, the boot record generation module 510 may cause the processor 502 to generate the boot record according to predetermined rules without relying on a boot record in another location. The boot record generation module 510 may cause the processor 502 to lay out the boot record in the image file so that a storage device to which the image file is deployed will be bootable. For example, the location of the boot record in the image file and the organization of the boot record may cause the boot record to be written to a boot partition and have a proper structure for booting when the image file is deployed onto a storage device. Referring to FIG. 1, the boot record generation module 510, when executed by the processor 502, may realize a block copy component 120.

The computer-readable medium 500 may include a metadata tree tracing module 520 that causes the processor 502 to trace a metadata tree to find live data in a file system (e.g., a COW file system). The metadata tree may include a root node. Live data that is found by following a path through the metadata tree may be included in an image of the file system. Data that cannot be reached by following a path through the metadata tree may not need to be included in the image. For example, the COW file system may write new data, add a path from the root node to the new data, and then remove a path to the old data. The old data may remain until the space is reclaimed. However, the old data may not be reachable from the root node, so it may not be included in the live data found by tracing the metadata tree.

The computer-readable medium 500 may include a file system writing module 530 that causes the processor 502 to write the COW file system to the image file. The file system writing module 530 may cause the processor 502 to write live data found by tracing the metadata tree to the image file. The file system writing module 530 may cause the processor 502 not to write data unreachable from the root node to the image file. A final image file may include a boot record that will be usable to boot devices to which the image file is deployed. The final image file may also include a complete COW file system, which may include multiple subvolumes or snapshots, but without unreferenced data and unused space from the original COW file system. When executed on the processor 502, the metadata tree tracing module 520 and the file system writing module 530 may realize a logical copy component 130.

Figure 6:
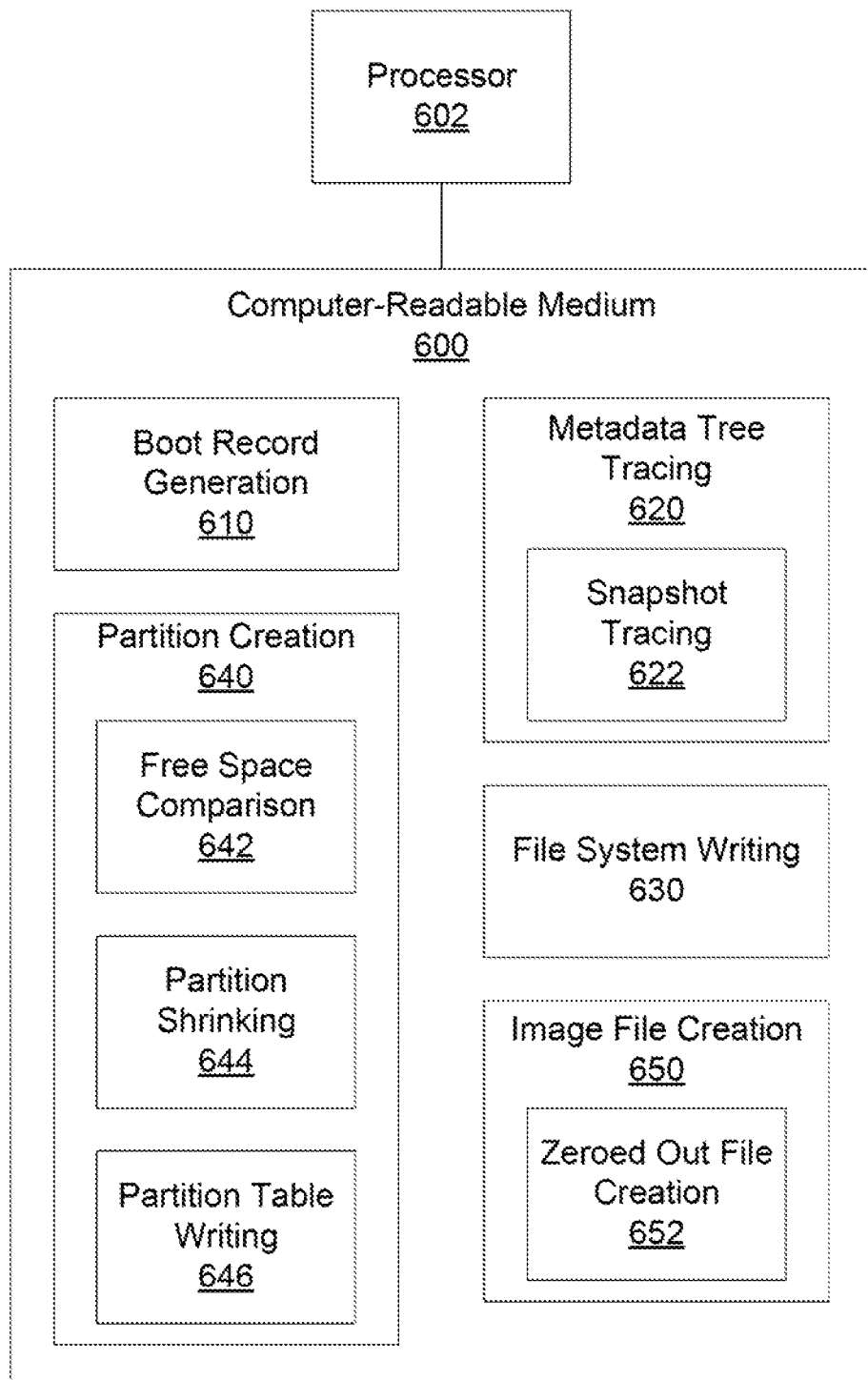
FIG. 6 is a block diagram of another example of a computer-readable medium containing instructions to copy data.

FIG. 6 is a block diagram of another example of a computer-readable medium 600 containing instructions that when executed by a processor 602, cause the processor 602 to copy data. A first partition may contain a COW file system. The computer-readable medium 600 may include a partition creation module 640 that causes the processor 602 to create a second partition. The partition creation module 640 may include a free space comparison module 642 that causes the processor 602 to compare consumed space on a storage device containing the COW file system with available free space to determine whether there is enough space to create a second partition containing an image file of the COW file system. In an example implementation, the free space comparison module 642 causes the processor 602 to add an offset to the consumed space and to determine whether free space exceeds resulting sum. The free space comparison module 642 may cause the processor 602 to compare the free space to the space occupied by live data in the COW file system, to the space occupied by live and unreferenced data in the COW file system, or the like.

The partition creation module 640 may include a partition shrinking module 644 that causes the processor 602 to shrink the first partition. If there is sufficient space to create a new partition with an image file of the COW file system, the partition shrinking module 644 may cause the processor 602 to shrink the first partition to create an unpartitioned space. In an example implementation, the partition shrinking module 644 may cause the processor 602 to shrink the first partition in response to the free space exceeding the consumed space plus the offset. The partition shrinking module 644 may cause the processor 602 to shrink the first partition until there is sufficient room for an image file of the COW file system on a new partition. The partition shrinking module 644 may cause the processor 602 to shrink the first partition by causing the processor 602 to instruct the COW file system to resize itself and causing the processor 602 to update a partition table. The partition creation module 640 may include a partition table writing module 646 that causes the processor 602 to create the second partition using the unpartitioned space that was made available by the shrinking of the first partition. The partition table writing module 646 may update the partition table to create the second partition. Referring to FIG. 2, the partition creation module 640, when executed by the processor 602, may realize the partition creation module 240.

The computer-readable medium 600 may include an image file creation module 650 that causes the processor 602 to create an image file on the second partition. The image file creation module 650 may include a zeroed out file creation module 652 that causes the processor 602 to create a zeroed out image file that can later be edited to include the desired contents of the image file. For example, the image file creation module 650 may cause the processor 602 to create the image file on the second partition prior to generating a boot record in the image file or writing a COW file system to the image file. The image file creation module 650 may realize the file creation component 210 of FIG. 2 when executed by the processor 602.

The computer-readable medium 600 may include a boot record generation module 610 that causes the processor 602 to generate a boot record in the image file. For example, the boot record generation module 610 may cause the processor 602 to generate the boot record based on a boot record in another location, to use predetermined rules to generate the boot record, or the like. When executed by the processor 602, the boot record generation module 610 may realize the block copy component 220 of FIG. 2.

The computer-readable medium 600 may include a metadata tree tracing module 620 that causes the processor 602 to trace a metadata tree to find live data in a COW file system. The metadata tree tracing module 620 may include a snapshot tracing module 622 that causes the processor 602 to trace the metadata tree to find live data associated with a selected snapshot or subvolume on the COW file system. For example, a user may have indicated that a particular snapshot or subvolume is to be written to the image file rather than the entire file system. Accordingly, the snapshot tracing module 622 may cause the processor 602 to find the user indicated snapshot or subvolume in the metadata tree and then find the live data associated with that snapshot or subvolume. Alternatively, or in addition, the metadata tree tracing module 620 may cause the processor 602 to trace the metadata tree to find all live data associated with the COW file system.

The computer-readable medium 600 may include a file system writing module 630 that causes the processor 602 to write the COW file system to the image file. The file system writing module 630 may cause the processor 602 to write the data identified by the metadata tree tracing module. For example, the file system writing module 630 may cause the processor 602 to write live data associated with a snapshot or subvolume to the image file or to write all live data associated with the COW file system to the image file. The file system writing module 630 may write all the metadata necessary to have a complete, functional filing system to the image file regardless of whether a single snapshot or subvolume or all live data is being written. The resulting image file may include a boot record and live data from the COW file system but not unreferenced data. The metadata tree tracing module 620 and the file system writing module 630, when executed by the processor 602, may realize the logical copy component 230.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:
1. A system, comprising:
a storage device;
a processor;
a computer-readable medium storing code executable by the processor to:
create a blank the on the storage device;
block-for-block copy every block of a source boot partition to a boot partition of the blank file; and
logically copy just live data and do not copy unreferenced data from a source root partition to a root partition of the blank file, by:
for each of a plurality of pieces of data of the source root partition, determining whether a reference counter of metadata of the source root partition is zero, indicating that the piece of data is unreferenced data that is not referenced within a tree structure of the source root partition, or whether the reference counter is non-zero, indicating that the piece of data is referenced within the tree structure and is referenced data;
generating a plurality of commands provided by a file system of the source root partition;
executing the plurality of commands to recreate a structure of the file system on the root partition of the blank file; and
executing the plurality of commands to copy just each piece of data for which the reference counter is non- zero to the root partition of the blank file including the live data and not the piece of data that is unreferenced data.

2. The system of claim 1, wherein the source boot partition and the source root partition are stored on the storage device.

3. The system of claim 2, wherein the code is further executable by the processor to:
determine that free space of the storage device exceeds consumed space of the storage device plus an offset;
shrink the source root partition to create an unpartitioned space; and
create a new partition using the unpartitioned space, wherein the processor is to create the blank file on the new partition.

4. The system of claim 1, wherein the root partition includes a copy-on-write file system, and wherein the copy-on-write file system includes live and unreferenced versions of a stored file.

5. The system of claim 1, wherein the data determined to be live from the source root partition includes a plurality of subvolumes.

6. A method, comprising:
block-for-block copying, using a processor, every block of a boot record from a first storage device to a boot partition of a source image file on the first storage device;
logically copying just live data and not copying unreferenced data from a source root partition of the first storage device to a root partition of the source image file, by:
for each of a plurality of pieces of data of the source root partition, determining whether a reference counter of metadata of the source root partition is zero, indicating that the piece of data is unreferenced data that is not referenced within a tree structure of the source root partition, or whether the reference counter is non-zero, indicating that the piece of data is referenced within the tree structure and is referenced data;
generating a plurality of commands provided by a file system of the source root partition;
executing the plurality of commands to recreate a structure of the file system on the root partition of the source image file;
executing the plurality of commands to copy just each piece of data for which the reference counter is non-zero to the source image file including the live data and not the piece of data that is unreferenced data; and
writing the source image file from the first storage device to an image file on a second storage device.

7. The method of claim 6, further comprising determining that there is space to store the source image file on the first storage device.

8. The method of claim 7, further comprising creating a partition on the first storage device large enough to hold the source image file.

9. The method of claim 6, wherein the file system includes a plurality of snapshots.

10. A non-transitory computer-readable medium comprising instructions that, when executed by a processor, cause the processor to:
block-for-block copy every block of a source boot partition to a boot partition of an image the; and
logically copy just live data and do not copy unreferenced data from a source root partition to a root partition of the image file, by:
for each of a plurality of pieces of data of the source root partition, determining whether a reference counter of metadata of the source root partition is zero, indicating that the piece of data is unreferenced data that is not referenced within a tree structure of the source root partition, or whether the reference counter is non-zero, indicating that the piece of data is referenced within the tree structure and is referenced data;
generating a plurality of commands provided by a file system of the source root partition;
executing the plurality of commands to recreate a structure of the file system on the root partition of the image file; and
executing the plurality of commands to copy just each piece of data for which the reference counter is non zero to the root partition of the image file including the live data and not the piece of data that is unreferenced data.

11. The non-transitory computer-readable medium of claim 10, wherein the instructions, when executed by the processor, cause the processor to create the image file as a zeroed out file.

* * * * *